United States Patent [19]
Huber et al.

[11] Patent Number: 5,499,952
[45] Date of Patent: Mar. 19, 1996

[54] METHOD AND ARRANGEMENT FOR CONTROLLING THE POWER OF A DRIVE UNIT OF A MOTOR VEHICLE

[75] Inventors: Werner Huber, Schwaikheim; Martin Streib, Vaihingen, both of Germany

[73] Assignee: Robert Bosch GmbH, Stuttgart, Germany

[21] Appl. No.: 233,415

[22] Filed: Apr. 28, 1994

[30] Foreign Application Priority Data

Apr. 27, 1993 [DE] Germany .............. 43 13 746.6

[51] Int. Cl.⁶ .................. B60K 26/04; B60K 28/16; F02D 11/10; F16H 59/14
[52] U.S. Cl. ............................. 477/115; 477/906
[58] Field of Search ................... 477/906, 115

[56] References Cited

U.S. PATENT DOCUMENTS

| | | | |
|---|---|---|---|
| 4,603,675 | 8/1986 | Junginger et al. | 123/478 |
| 4,635,508 | 1/1987 | Tatsumi | 477/906 |
| 4,823,644 | 4/1989 | Ohkumo | 477/906 |
| 4,833,613 | 5/1989 | Mack et al. | 477/906 |
| 4,833,947 | 5/1989 | Izumi et al. | 477/906 |
| 4,922,425 | 5/1990 | Mack et al. | 477/906 |
| 4,975,844 | 12/1990 | Holbrook et al. | 477/906 |
| 5,019,810 | 5/1991 | Ito et al. | 477/906 |
| 5,056,022 | 10/1991 | Witowski et al. | 477/906 |
| 5,177,711 | 6/1992 | Iizuka | 477/906 |
| 5,366,424 | 11/1994 | Wataya | 477/906 |

*Primary Examiner*—Dirk Wright
*Attorney, Agent, or Firm*—Walter Ottesen

[57] ABSTRACT

The invention is directed to a method and an arrangement for controlling the power of a drive unit of a motor vehicle wherein a power-output element is set on the basis of an operator-controlled element actuated by the driver and the power-output element can assume positions different with respect to the position of the operator-controlled element depending upon operating range. A maximum permissible position of the power-output element is determined on the basis of the position of the operator-controlled element as well as on the basis of data with respect to the operating range for function monitoring the setting of the power-output element and a fault is then detected when the actual position of the power-output element exceeds the maximum permissible value.

13 Claims, 3 Drawing Sheets

METHOD AND ARRANGEMENT FOR CONTROLLING THE POWER OF A DRIVE UNIT OF A MOTOR VEHICLE

BACKGROUND OF THE INVENTION

U.S. Pat. No. 4,603,675 discloses a method and an arrangement for controlling the drive power of a motor vehicle. Here, a driver command is detected on the basis of the position of an operator-controlled element actuated by the driver and a power-output element is controlled to a position pregiven by the driver command by means of a position control. The power-output element influences the power of the drive unit. The detected positions of the operator-controlled element and of the power-output element are compared to each other with respect to impermissible deviations in order to improve the operational reliability of this system which supplies fuel via an electric circuit.

If the position of the operator-controlled element and the position of the power-output element depart impermissibly from each other and if the power-output element is significantly further open than the position set by the driver command, then a fault in the control system is recognized and, if required, countermeasures are initiated. The precondition for a procedure of this kind is that a fixed relationship between driver command or position of the operator-controlled element and the position of the power-output element is present for normal function of the system and, if required, in the context of the permissible tolerance. The known procedure cannot be satisfactorily utilized in systems where additional influences are provided which even for normal operation actuate the power-output element especially in the direction of increased power with respect to the driver command present.

SUMMARY OF THE INVENTION

In view of the above, it is an object of the invention to provide an arrangement wherein faults can be detected even in systems wherein the power-output element is not only actuated on the basis of the driver command but also actuated electrically independently of this command.

This is achieved in that to each position of the operator-controlled element is assigned a limit value for the position of the power-output element and a fault is detected and corresponding countermeasures initiated when the limit value, which is assigned to the present position of the operator-controlled element, is exceeded. Each position of the operator-controlled element is assigned a limit value based on data with respect to the instantaneous operating range of the motor vehicle drive.

U.S. patent application Ser. No. 08/050,085, filed Apr. 28, 1993, discloses a method and an arrangement for controlling the drive train of a motor vehicle, the power of the drive unit and of the automatic transmission. On the basis of the accelerator pedal position (the driver command), an output desired torque is determined which is converted into an optimal transmission ratio and a motor torque desired value. The power-output element is then set based on additional operating variables of the motor and/or of the motor vehicle in such a manner that the pregiven motor torque desired value is made available and the output torque assumes the desired value determined on the basis of the driver command. In a procedure of this kind, and in contrast to the above-mentioned U.S. Pat. No. 4,603,675, a specific position of the power-output element is no longer assigned to each accelerator pedal position; instead, operating points exist at which the power-output element is, for example, actuated to open wide and the operator-controlled element is only partially actuated. This is because the optimal transmission ratio is set first based on the driver command and only secondly is the motor power adjusted via the displacement of the power-output element. This leads to the condition that the lower the transmission ratio set by the transmission, the wider the power-output element must be opened for a pregiven position of the operator-controlled element. The procedure provided by the invention is preferably applicable in an arrangement of this kind.

In addition, the so-called motor drag torque control is known wherein the power-output element is displaced independently of the driver command in open direction when, for example, slip occurs at the drive wheels during overrun.

The procedure provided by the invention guarantees the operational reliability of the control system even for systems where there is no fixed relationship between the position of the operator-controlled element and the position of the power-output element.

Advantages are provided by the procedure of the invention especially for control systems for the drive train which control the motor power as well as the transmission and wherein the motor power is adapted to the setting of the gear transmission ratio.

The procedure of the invention can also be applied in combination with a motor drag torque control or a drive slip control and provide the above-described advantages.

The assignment of maximum permissible positions of the power-output element to the actual position of the operator-controlled element for various operating ranges of the drive is especially advantageous.

Advantageously, the corresponding assignment for each transmission ratio is pregiven in combination with the control system for the drive train.

This assignment can be derived in an advantageous manner from the function of the control in combination with a motor drag torque control.

The invention is especially significant in that, even when the gear information present is incorrect, the availability and operational reliability of the control system are guaranteed.

The monitoring of the adjustment of the output element can be carried out even during the shifting operation in an advantageous manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
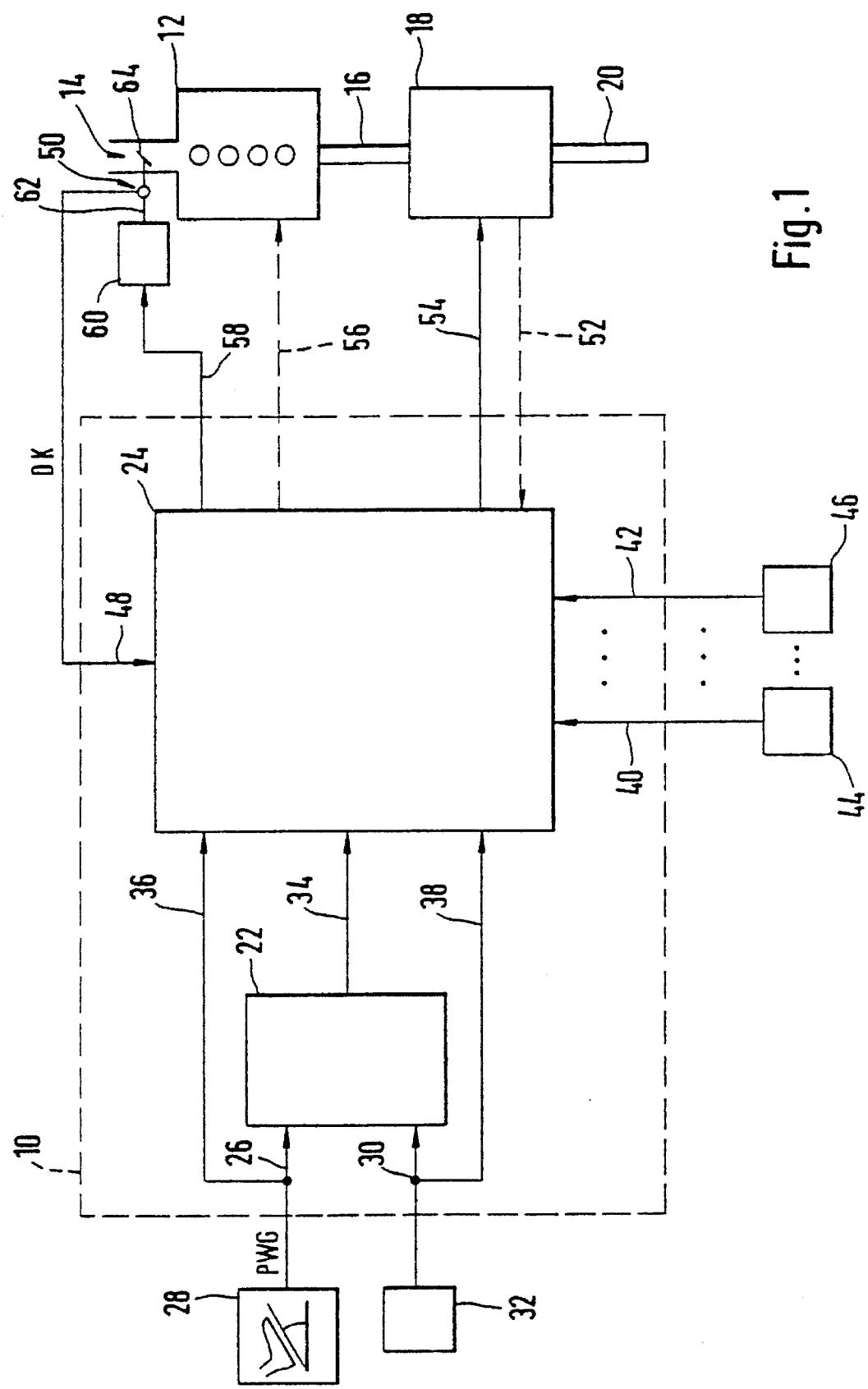
FIG. 1 is an overview block circuit diagram of a control system showing the arrangement of the invention wherein the method of the invention is applied.

FIG. 1 shows a control system of a preferred embodiment wherein the method of the invention is applied. FIG. 1 shows a control apparatus 10, an internal combustion engine 12 having an intake pipe 14, a crankshaft 16 as well as a transmission unit 18 having an output shaft 20. The schematically illustrated control apparatus 10 includes an element 22 for determining the driver command as well as an element 24 for carrying out the control of the drive train. A first line 26 from a measuring device 28 is connected to the element 22. The measuring device 28 detects the position of an operator-controlled element actuated by the driver, preferably an accelerator pedal. A measuring device 32 for detecting the output rpm or the road speed is connected to element 22 via an input line 30. The output line 34 of the element 22 is connected to the element 24.

Line 36 connects line 26 to element 24 and line 38 connects line 30 to element 24. Measuring devices 44 to 46 are provided for detecting additional operating variables of the drive unit or of the motor vehicle and are connected to element 24 via lines 40 to 42, respectively. Measuring device 50 detects the position (DK) of the power-output element 64 and is connected to element 24 via input line 48. Broken line 52 connects element 24 to the transmission unit 18. The output line 54 connects element 24 to the transmission unit 18 and the output line 56 connects element 24 to the drive unit 12 to adjust the metering of fuel and/or the ignition. In addition, a third output line 58 is provided which connects the element 24 to the power-output element 64 via the actuating motor 60. The actuating motor 60 is connected via a mechanical connection 62 to an electrically-actuable throttle flap 64 mounted in the intake channel 14 of the drive unit 12. The block circuit diagram is presented herein to provide an overview whereas, in reality, the control apparatus 10 comprises essentially at least one computer element.

The invention as discussed above is applied to a throttle flap. However, the method and arrangement of the invention can also be advantageously applied to the control of a control rod or the lever of an injection pump of a diesel engine.

The basic operation of the preferred embodiment shown schematically in FIG. 1, in which the procedure provided by the invention is applied, is essentially known from U.S. patent application Ser. No. 08/050,085, filed Apr. 28, 1993, incorporated herein by reference, and is only briefly outlined below.

The driver command is detected in element 22 by means of a predetermined characteristic field or a table on the basis of the position of the operator-controlled element 28 (signal PWG) actuated by the driver and the road speed or the output rpm of the drive train. The signals used for this purpose are processed and normalized to minimum and maximum values at least in the case of the positioning signal. A desired value for the drive torque of the drive train is transmitted from element 22 via the line 34 to the element 24. This desired value is characteristic of the driver command. In element 24, an optimal transmission ratio is selected at least in dependence upon the output torque desired value and the instantaneous output rpm, for example, on the basis of a characteristic field or pursuant to a pregiven computation standard. This optimal transmission ratio is adjusted at the transmission unit 18 via the output line 54. The adjusted transmission ratio Gact is fed back to the element 24 via input line 52. The element 24 determines the motor torque to be adjusted on the basis of the set transmission ratio, the output torque desired value and the output rpm. The motor torque is corrected by considering additional operating variables such as: engine temperature, status of ancillary consumers, battery voltage, rpm of the turbine shaft of a converter as may be required and/or the status of a controllable converter clutch, et cetera. Control signals for adjusting the power-output element (the throttle flap 64) and, if necessary, the metering of fuel and/or the ignition are determined from the motor torque desired value determined from computations or by means of a characteristic field. In the preferred embodiment, a throttle flap desired value is determined which is adjusted in the sense of an approximation of the actual value to the desired value via a position controller by means of the actuation of the actuating motor 60 while feeding back the position of the throttle flap 64 through the measuring element 50 and the line 58.

For a check of the function of the setting of the power-output unit (60, 62, 64) on the basis of the driver command, it is no longer possible to use the procedure known from the state of the art of a comparison of the accelerator pedal position values to the throttle flap position values in all operating points and in all operating ranges of the control system. This is the case because of the transmission control. It is suggested to consider the data as to the actually set transmission ratio or gear stage in addition to data with respect to the position of the operator-controlled element and the power-output element to ensure the operational readiness and availability of the setting of the power-output element. This procedure takes place in the context of element 24 with the applied signal variables with respect to the operator-controlled element and the power-output element being processed and preferably normalized.

In a preferred embodiment to ensure operational reliability and availability, the combination of the three sets of data is computed in a second computer element which is independent of the first computer element in which the setting of the power-output element is computed. In another embodiment, the monitoring can be realized in a hardware module. The computation of the motor torque desired value and transmission ratio can also take place in an additional computer element.

For monitoring, a maximum permissible position of the power-output element is pregiven within each operating range (for each gear and the transmission ratio corresponding thereto) for each position of the operator-controlled element. Thus, and referring to FIG. 2, for each gear I to IV, the power-output element (throttle flap 64) is assigned a maximum permissible position for a predetermined position of the operator-controlled element (accelerator pedal 28). This is based on the following interrelationship. In the first gear, the normalized position value of the power-output element must not be greater than the normalized position value of the operator-controlled element plus an estimated value for the idle air requirement and a tolerance value. The relationship between accelerator pedal position values and the throttle flap position values is thereby essentially linear in first gear. For a released accelerator pedal, a throttle flap position is permissible which corresponds to the widest open position of the throttle flap to ensure idle operation (plus tolerance). In contrast, in the higher gears, a position value of the power-output element is permissible which results from the position of the operator-controlled element multiplied by the transmission ratio of the first gear and divided by the transmission ratio of the gear which is actually in place. Tolerance values and idle air requirement are to be considered. The last-mentioned values are the same for all gear stages.

Figure 2:
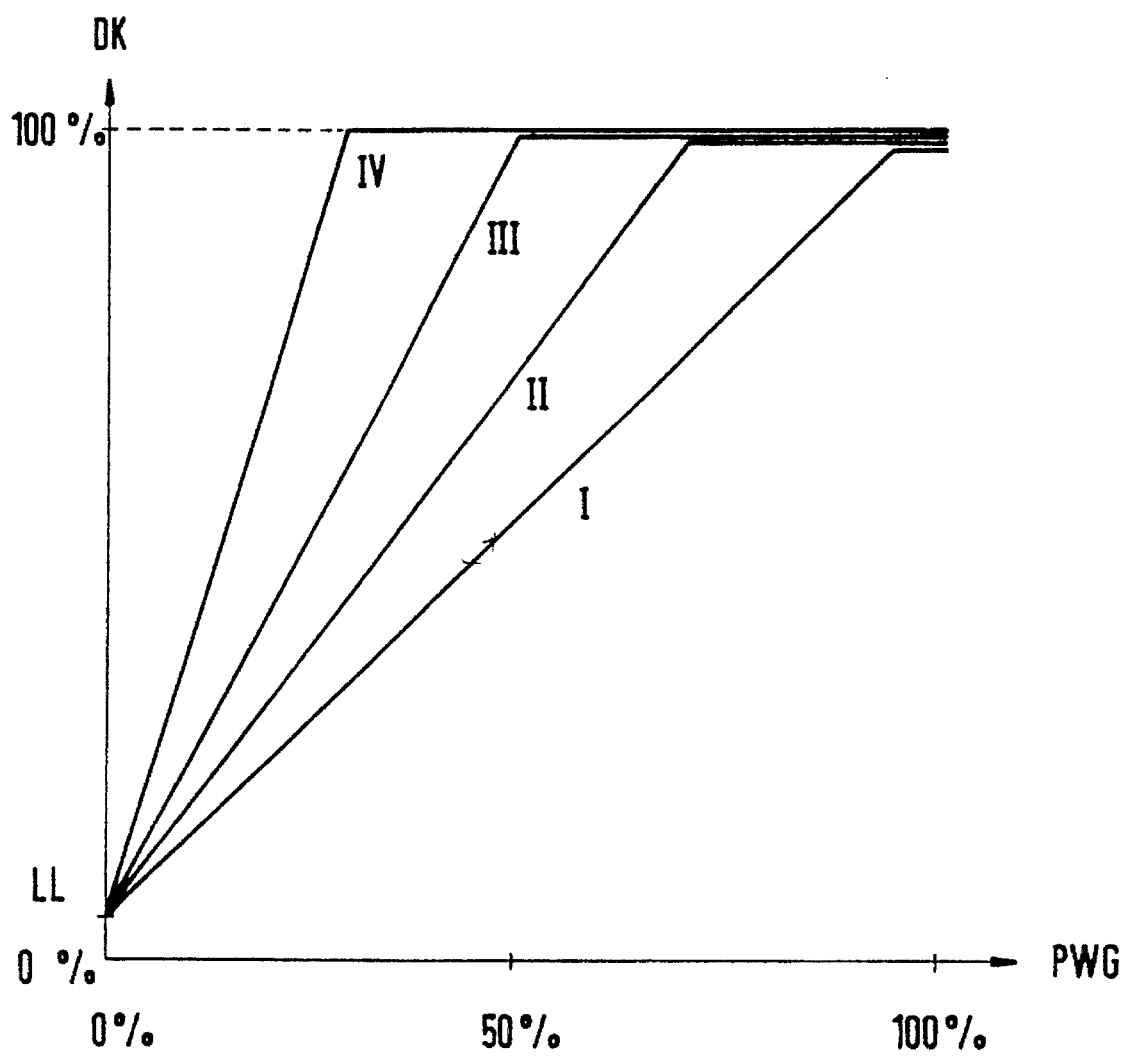
FIG. 2 shows a diagram wherein the assignment of the position of the operator-controlled element to the maximum permissible positions of the power-output element is defined for the various operating ranges of the control system; and, FIG 3 shows a flowchart which is exemplary of a realization of an embodiment of the method of the invention by means of a computer program.

The corresponding relationship between the position of the operator-controlled element and the position of the power-output element is defined in a preferred embodiment in FIG. 2. The transmission used there includes four gear stages. The normalized position value PWG of the operator-controlled element is plotted along the horizontal axis from 0% to 100%; whereas, the normalized position value DK of the power-output element is plotted along the vertical axis from 0% to 100%. The position LL of the power-output element corresponds then to the opening of the power-output element to ensure idle operation plus a pregiven tolerance range. The straight lines shown in the drawing for the gear stages I to IV define linear relationships between the accelerator pedal position and the maximum permissible position of the power-output element. If the position of the power-output element for a specific position value of the operator-controlled element exceeds the limit value pregiven for the particular gear stage, then a fault is detected and, if necessary, countermeasures are initiated in the form of power reduction or power limitation of the drive unit.

The relationships shown in FIG. 2 are shown to be optimal in a preferred embodiment. The procedure provided by the invention can be applied also in connection with one or more transmission stages or in combination with a continuous transmission. For this purpose, the rpm or torque ratio can be applied in lieu of the gear stage to determine the operating range and the characteristic line field of FIG. 2 can be converted into a characteristic field.

In addition, the procedure provided by the invention is not limited to the presetting of linear relationships. In other embodiments, it has been shown suitable that step-shaped traces, parabolically-shaped relationships or other functional relationships are advantageous. This is primarily a question of the selected switching strategy which determines the maximum opening of the power-output element in each gear stage. If, for example, during acceleration of the motor vehicle, a lower gear is shifted into too early, the maximum permissible throttle flap position is less than shown in FIG. 2 at least for large accelerator pedal position values so that a non-linear trace of the characteristic line or at least a different slope is provided.

Figure 3:
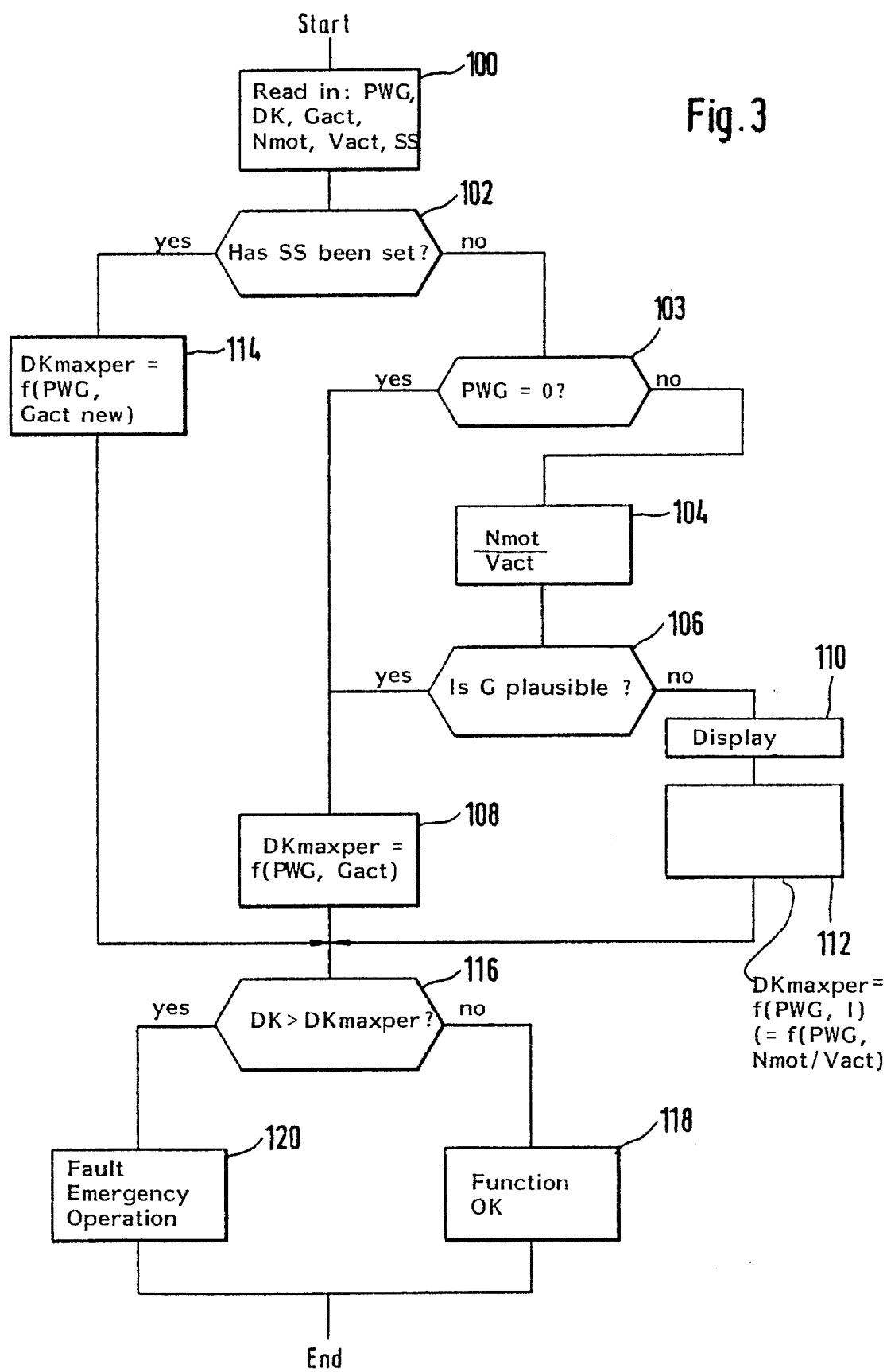

With respect to the above preferred embodiment, FIG. 3 shows a flowchart wherein the method of the invention is realized as a computer program.

After the start of the subprogram, the operating variables used in the following are read-in in the first step 100. These operating variables include: the position PWG of the operator-controlled element, the position DK of the power-output element, the actual transmission ratio Gact, motor rpm Nmot, actual speed Vact (or output rpm Nab) as well as the shift mark SS characterizing the shift operation.

In addition, the transmission data Gact must be checked as to accuracy in the context of the method of the invention. This is necessary because incorrect gear data can possibly lead to an unwanted operating situation. As can be derived from FIG. 2 (for the case when the system is in the operating range of gear stage I), data with respect to gear stage III are present so that an impermissible opening of the power-output element for a pregiven accelerator pedal position can take place and an occurring fault condition would accordingly be detected considerably later.

In contrast to the above, and for a released accelerator pedal, the maximum permissible angle of the throttle flap corresponds to the idle air requirement plus a tolerance value. The above-mentioned unwanted situation does therefore not occur for a released accelerator pedal. For a released accelerator pedal, the plausibility check of the gear information described in the following can be omitted. This provides a significant advantage of the method and arrangement according to the invention.

Step 102 follows step 100 and a check is made in step 102 as to whether the shift mark has been set, that is, whether a shift operation is present or not. If this is not the case, then an inquiry is made in step 103 as to whether the accelerator pedal is released. This is the case when the signal PWG drops below a predetermined value and is preferably zero. In this case, the program proceeds with step 108 described further below; whereas, for an actuated pedal, the quotient is formed in step 104 from the motor rpm and the road speed (or the output rpm) in order to check the transmission data G as to plausibility. The quotient value determined and the read-in gear data are compared to each other in inquiry step 106, for example, on the basis of a table. A specific gear stage is assigned to each quotient value. Plausibility is determined provided that the detected quotient value corresponds to the present gear stages.

If the gear data is correct or the accelerator pedal has been released, then the maximum permissible throttle flap angle DKmaxper is read out on the basis of the operator-controlled element position PWG and the gear data G. If it had been detected in inquiry step 106 that the present gear data is not plausible, that is, incorrect, then this would first be shown in step 110 for diagnostic purposes and then the maximum permissible throttle flap angle DKmaxper would be determined in accordance with step 112 on the basis of the operator-actuable element position PWG and the gear data determined from the quotient of the motor rpm and the road speed depending upon the particular embodiment. The signals with respect to motor rpm and road speed have been previously detected as being free of fault. In another embodiment, the maximum permissible throttle flap angle is determined as a function of the position of the operator-controlled element PWG based on the characteristic line of the first gear, that is, on the smallest throttle flap values.

If the presence of a shift operation was detected in step 102, then the maximum permissible throttle flap angle during the shift operation can be determined in an advantageous embodiment of the invention. The maximum permissible throttle flap angle is determined on the basis of the characteristic lines of FIG. 2 starting from the position of the operator-controlled element and the gear stage of the new gear. This is advantageous for a control system wherein the throttle flap is not actuated beyond the maximum permissible angle in the new gear during the shift operation.

If in the procedure described above, the maximum permissible throttle flap angle for the existing operating point had been determined, then in step 116, a check is made as to whether the actual throttle flap angle DK is greater than the maximal angle. If this is not the case then, according to step 118, the function of the system would be detected as being in order and the subprogram would be repeated at a pregiven time. If the actual throttle flap angle would, however, exceed the maximum permissible angle, then according to step 120, a fault condition would be detected and this would be displayed or a fault flag would be set and emergency measures initiated. These emergency measures could be a cutoff of the fuel above a pregiven motor rpm or the like. Thereafter, the subprogram is repeated at a pregiven time.

The invention has special significance also in the context of other applications. For example, for a motor drag torque control when slip occurs at the drive wheels, the throttle flap is opened to a greater extent than the position pregiven by the driver. In such a function, the monitoring measures known from the state of the art are likewise not applicable. Here too, a relationship as shown in FIG. 2 between the accelerator pedal position and the throttle flap angle can be pregiven while distinguishing between operation with and operation without motor drag torque control intervention. The maximum permissible throttle flap angle in the operating region "motor drag torque control" results then from the maximum limitation of this intervention. Another solution provides that the maximum permissible throttle flap angle is determined from the amount of the desired value change triggered by the intervention.

Similar relationships result from the monitoring of the lower limits of the position of the power-output element. This leads in the application of the drive train control to a permissible position range which is pregiven for each gear stage.

In one embodiment, the consideration of the state of a converter clutch of the automatic transmission has been proven advantageous. This leads to a multidimensional characteristic field for the maximum permissible angle for which different relationships between gear data and accelerator pedal data are pregiven in dependence upon the state of the converter clutch (open, closed, controlled).

The invention can be utilized also in combination with a drive slip control. The minimal permissible throttle angle can then be derived from the intervention signal.

It is understood that the foregoing description is that of the preferred embodiments of the invention and that various changes and modifications may be made thereto without departing from the spirit and scope of the invention as defined in the appended claims.

What is claimed is:

1. A method for controlling the power of a drive unit of a motor vehicle driven by a driver, the drive unit including a power-output element which is controlled into a driver-commanded position on the basis of the position of an operator-controlled element actuable by the driver, said power-output element being adjustable to positions different from said driver-commanded position depending upon the operating state of said drive unit, the method comprising the steps of:

detecting an operating variable which represents the operating state of said drive unit;

determining a maximum permissible limit value for the position of said power-output element based upon the position of said operator-controlled element and said operating variable; and, determining a fault when the position of said power-output element exceeds said maximum permissible limit value.

2. The method of claim 1, comprising the further step of initiating countermeasures when said limit value is exceeded.

3. The method of claim 1, comprising the further step of determining said limit value from a pregiven characteristic on the basis of the position of said operator-controlled element, gear data and/or the setting of a converter clutch.

4. A method for controlling the power of a drive unit of a motor vehicle driven by a driver, the drive unit including an engine and a transmission connected to the engine, the drive unit further including a power-output element which is controlled into a driver-commanded position on the basis of the position of an operator-controlled element actuable by the driver, said power-output element being adjustable to positions different from said driver-commanded position depending upon the operating state of said drive unit, the method comprising the steps of:

detecting an operating variable which represents the operating state of said drive unit;

determining a maximum permissible limit value for the position of said power-output element based upon the position of said operator-controlled element and said operating variable;

determining a fault when the position of said power-output element exceeds said maximum permissible limit value; and, the maximum permissible set value of said power-output element not being greater than the corresponding position value of said operator-controlled element plus a value for idle operation of the engine and, if required, a tolerance value.

5. The method of claim 4, said transmission having a first gear and additional gears which are selectively engaged during operation of the motor vehicle, further comprising the step of determining the maximum permissible set value for said power-output element from the position value of said operator-controlled element multiplied by the transmission ratio in the first gear and divided by the transmission ratio of the actual gear engaged plus said idle value and, if required, said tolerance value.

6. The method of claim 5, comprising the further steps of:

detecting the rpm of said engine and the road speed of said motor vehicle;

determining a quotient formed from said engine rpm and said road speed of the motor vehicle or from said engine rpm and the output rpm of said transmission;

comparing, at least when the operator-controlled element is actuated, the gear data to said quotient; and, determining that said gear data is correct when said gear data corresponds to said quotient.

7. The method of claim 6, wherein no check is made of the gear data when said operator-controlled element is released.

8. The method of claim 7, wherein: said first gear has a characteristic line associated therewith which defines the position of said power-output element as a function of the position of said operator-controlled element; and, when said gear data is not plausible, the method comprises the further step of applying the characteristic line of the first gear or, in lieu of said gear data, the quotient of the rpm of the motor of said drive unit and the road speed or the output rpm of said transmission.

9. The method of claim 8, wherein, during a shift operation, the maximum permissible set value of said power-output element is determined on the basis of the gear data of a new one of said gears of said transmission.

10. The method of claim 9, wherein said limit value is a minimum permissible set value.

11. The method of claim 10, wherein said method is carried out in combination with a motor drag torque control and/or a drive slip control.

12. An arrangement for controlling the power of a drive unit of a motor vehicle, the drive unit including an electrically actuable power-output element and an operator-controlled element actuable into positions by the driver, said drive unit further including a transmission, the arrangement comprising:

a control unit for determining the driver command on the basis of the position of said operator-controlled element and for actuating said power-output element to assume a driver-command position corresponding to the position of said operator-controlled element;

said control unit including means for actuating said power-output element so as to cause said power-output element to assume positions different from said driver-command position depending upon the operating state of said drive unit;

said control unit further including means for detecting a variable representing the actual operating state of said drive unit and means for determining a maximum permissible limit value for the position of said power-output element in dependence upon the position of said operator-controlled element and said variable; and, said control means further including means for determining a fault when the position of said power-output element exceeds said limit value.

13. The arrangement of claim 12, further comprising means for initiating countermeasures when said fault is detected.

* * * * *